May 26, 1942.  J. F. BEAL  2,283,905
SWITCH HANDLE
Filed May 31, 1940
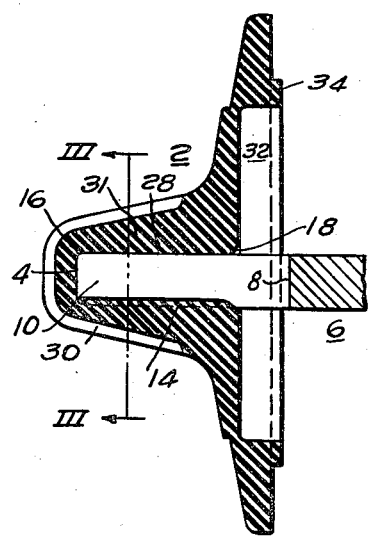
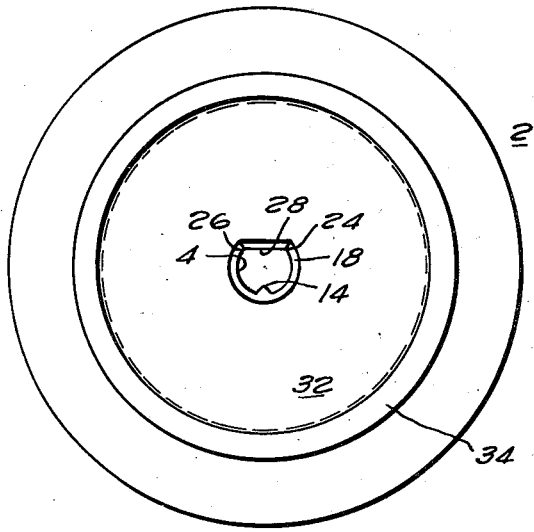
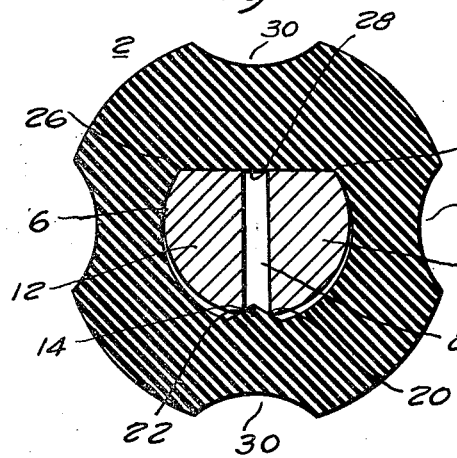
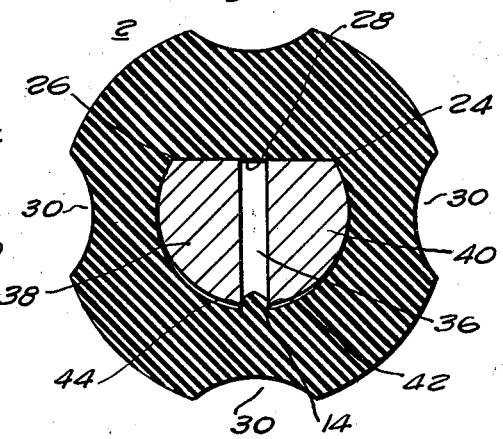
WITNESSES:
INVENTOR
James F. Beal.
BY
ATTORNEY Patented May 26, 1942

2,283,905

UNITED STATES PATENT OFFICE 2,283,905

SWITCH HANDLE

James F. Beal, Bridgeport, Conn., assignor to The Bryant Electric Company, Bridgeport, Conn., a corporation of Connecticut Application May 31, 1940, Serial No. 338,085

10 Claims. (Cl. 287—53)

My invention relates, generally, to detachable handle structures, and, more particularly, to removable handle structures for electric switches.

In certain applications, such, for example, as in electric switches where an operating handle is mounted on an operating shaft at the front of a switch supporting or concealing panel and the shaft extends through the panel for operating a switch, it is highly desirable that such handles be quickly and easily detachable in a relatively simple manner to permit ready access to the switch.

One type of detachable mounting of an operating handle member on a switch or other operating shaft used heretofore, comprises a circular shaft having a flattened side and a split end construction for reception in a substantially D-shaped handle socket. Considerable difficulty has been encountered in these structures, due to variation in dimensions of the handle socket and the machined operating shafts. Dimensional variations which render a loose fit of the handle and shaft are objectionable not only from the standpoint of retention of the handle on the shaft, but in use, repeated impingements of the corners of the metallic shaft on the walls of the handle socket, which may be of a softer material, such as a molded material, eventually may render ineffective the driving connection between the handle and shaft.

One object of my invention, therefore, is to provide a detachable handle and operating shaft construction with means capable of automatically compensating for dimensional differences in the handle and shaft.

Another object of my invention is to provide in a detachable handle and shaft driving connection, novel means for insuring a tight fit of the parts.

Another object of my invention is to provide in a telescopic drive connection embodying noncircular interfitting parts each having at least one substantially straight side, novel means for insuring intimate engagement of said sides to provide a good driving connection.

These and other objects of my invention will become more apparent upon consideration of the following specification of a preferred embodiment thereof taken in connection with the attached drawing in which:

Figure 1 is a longitudinal sectional view through a handle and shaft embodying the novel connection of my invention;

Fig. 2 is a side view of the handle shown in Fig. 1 illustrating the handle socket with the shaft removed;

Fig. 3 is an enlarged transverse cross-sectional view taken substantially on the line III—III of Fig. 1; and Fig. 4 is a sectional view similar to Fig. 3 but showing a different dimensional relation between a handle socket and operating shaft.

Referring to Figures 1 to 3 of the drawing, I have shown a handle 2 which is preferably made of a non-metallic relatively soft material such, for example, as a molded material. The switch handle 2 is provided with an elongated substantially D-shaped socket 4, for the reception of the substantially D-shaped end of a switch controlling shaft 6. The shaft 6 is preferably of a harder material than that of the hand 2 and may be of any desired metal having some flexibility or resiliency such, for example, as steel or the like.

As shown more clearly in Fig. 3, the end of the shaft 6 is provided with a longitudinally extending slot 8 for dividing the end of the shaft into two tang portions 10 and 12, respectively. In forming the end of the shaft 6 in the manner shown, the shaft is preferably made from rod stock which is substantially circular in cross sectional shape, then one side is milled off to provide the flat side of the D-shape, and then a saw cut is made from the end of the shaft inwardly to form the slot 8. This method of machining the end of the shaft is subject to dimensional variations within certain limits, as is the socket 4 in the handle; with the variations in the socket dimensions being dependent on the method of manufacture of the socket. Consequently, the shaft end may fit in the handle socket 4 in the manner shown in Fig. 3 or 4, or their relative sizes may vary between the two sizes shown.

Obviously such dimensional variations will result in a great number of sloppy fits of the handle on the shaft, which will result in difficulties in maintaining the handles on the shaft by friction, and in the case of a loose fit, may cause breaking down of the relatively soft walls of the handle socket 4 by repeated impacts of the sharp edges of the shaft 6 thereagainst, so that in a short time the handle 2 is inoperative to rotate the shaft 6.

To overcome this difficulty and at the same time to insure the provision of a tight frictional fit between the shaft end and handle socket, and a good driving connection between the two, I provide an integral projection 14 on the inner wall of the handle socket 4 preferably positioned substantially opposite the center of the flat side 28 of the socket wall, although the projection 14 may be located substantially oppositely from the position shown, on the flat side of the handle socket, if desired. It will be noted that the projection 14 is provided with outwardly converging side walls for a purpose to be hereinafter described.

To facilitate entrance of the shaft end into the handle socket 4, I prefer to round off the outer edge of the shaft 6 as at 16, and provide a short flaring entrance 18 to the handle socket 4.

In assembling the handle onto a shaft such as the shaft 6, it is merely necessary to angularly locate the handle so that the flat side 28 of the handle socket is in alignment with the flat side of the shaft end, and then the handle may be pushed onto the shaft. This angular alignment of the handle with the shaft also aligns the projection 14 in the handle socket with the slot 8 between the shaft tangs 10 and 12. The projection 14 operates, when the handle is pushed onto the shaft to first move the flat side of the shaft into intimate engagement with the flat side 28 of the handle socket. Due to the converging walls of the projection 14 the tangs 10 and 12 may also be forced outwardly with respect to each other by the camming action of the inclined walls of the projection 14, so that the outer upper corners of the shaft are forced into the corners 24 and 26 of the handle socket, respectively. In the event the relative dimensions of the parts are such as to provide a relatively loose fit if my projection 14 were not employed, the position of the parts will then be substantially that shown in Fig. 3, with the sharp edges 20 and 22 of the tangs 10 and 12 in engagement with the converging sides of the projection 14 and with the flat side of the shaft in intimate engagement with the flat side 28 of the handle socket 4, and with the upper, outer corners of the tangs 10 and 12 forced into the corners 24 and 26 of the handle socket. It will be noted that the projection 14 forms a key for constraining the handle and shaft for rotation together, in cooperation with the flat surfaces on the shaft and socket walls.

In Fig. 3 I have shown a structure wherein the diameter of the circular portion of the shaft 6 is considerably less than the diameter of the circular portion of the socket 4, but, nevertheless, due to the cooperation of the projection 14 with the slot 8 between the shaft tangs 10 and 12, a tight fit of the shaft in the handle socket is obtained, as well as a good rotary driving engagement between the handle and shaft. It is particularly desired to point out that the driving engagement is provided by intimate engagement of the flat side 28 of the handle socket with the flat side of the shaft 6, which engagement is maintained by the projection 14 on the handle socket engaging both shaft tangs.

In Fig. 4 I have shown what occurs when the diameter of the switch shaft more nearly approximates the internal diameter of the handle socket. In this case when the handle is applied to the shaft, the same thing occurs as is described above in connection with Fig. 3, that is, the projection 14 in the handle socket engages in the slot 36 between the shaft tang portions 38 and 40, forcing the flat side of the shaft into intimate engagement with the flat side 28 of the handle socket 4. After this engagement takes place, the tangs 38 and 40 are then moved apart by the camming action of the inclined sides of the projection 14 until the upper corners thereof move into the corners 24 and 26 of the handle socket. Inasmuch as the shaft can no longer be moved by the projection upwardly or laterally, the lower sharp edges 42 and 44 of the shaft tangs being of a material harder than that of the handle 2, operate to cut grooves in the sides of the projection 14 as the handle is pushed onto the shaft, thereby forming, in effect, an additional key between the handle socket and shaft automatically predetermined in accordance with the relative size of the shaft and handle socket. This automatic cutting action of the sharp corners 42 and 44 of the sharp tangs follows movement of the tangs into intimate engagement of the flat surface of the shaft with the flat surface 28 of the handle socket and also follows separating movement of the tangs, all caused by the projection 14 as described above. In other words, the effect of the particular handle connection construction illustrated and described herein is to first form a tight-fitting connection between a handle and shaft irrespective of any dimensional variations of these parts, and thereafter additional material may be cut from the handle socket to accommodate the handle to provide an additional keying action coupling the handle and shaft together. The net result obviously is not only a rigid frictional connection of a handle and shaft, but also an improved driving connection therebetween.

As appears in Fig. 1, finger grooves 30 may be provided in the projecting portion 31 of the handle to facilitate manual manipulation thereof. Also, I may provide an enlarged shallow socket 32 at the end of the handle in which the socket 4 opens, surrounded by a spacing flange 34 which may engage a supporting or concealing panel for the switch operated by the shaft 6.

From the foregoing, it is apparent that I have provided a novel handle construction which not only operates to automatically compensate for varying dimensions of the handle and operating shaft on which the handle is adapted to be mounted, but also operates to provide an improved driving connection between the handle and rotary shaft which it is adapted to control. The automatic compensation for dimensional variations is obtained by providing means for first engaging flat portions of the handle and shaft, then expanding or separating the split end portions of the shaft, and thereafter, by a cutting operation taking place automatically when the handle is applied to the shaft, to form additional keying means between the handle and shaft. The improved rotary driving connection between the handle and shaft is obtained by the above-noted provision of respective flat surfaces on the handle and shaft maintained in intimate engagement and by the provision of an auxiliary keying construction at a remote point which is automatically formed when the handle is applied to the shaft.

Having described preferred embodiments of my invention in accordance with the patent statutes, I desire that it be understood that my invention is not limited to the particular embodiment disclosed herein, inasmuch as it will be obvious, particularly to persons skilled in the art, that many changes and modifications may be made in this particular structure without departing from the broad spirit and scope of my invention. Therefore, I desire that my invention be interpreted as broadly as possible, and that it be limited only by what is expressly set forth in the following claims and by the prior art.

I claim as my invention:

1. In a detachable driving connection, relatively telescoping members having cooperating portions non-circular in form, including at least one corresponding substantially flat side portion, one of said members being of a relatively soft material and the other of said members being of a relatively hard material, the latter member having a longitudinally extending side edge portion positioned to extend substantially normal with respect to a confronting wall portion so as to engage said wall portion when said members are telescoped together with said edge portion positioned in opposition with respect to said substantially flat side portion, whereby said edge portion is adapted to cut into the material of said wall portion of said other member to form a tight driving fit while forcing said substantially flat side portions into intimate engagement.

2. In a handle connection, the combination of a handle of relatively soft material having a non-circular socket therein including at least one substantially flat side, an operating shaft of relatively hard material having a similarly shaped end portion adapted to fit in said socket and provided with a substantially longitudinally extending edge portion positioned substantially opposite said flat side and positioned to extend substantially normal with respect to an inner wall portion of said socket when the handle is moved onto said shaft, so that any dimensional variations of said parts will be compensated for by the amount said edge portion cuts into said socket wall portion to obtain a tight fit and to cause intimate engagement of said flat sides of said handle socket and shaft.

3. In a detachable connection, relatively telescoping members, the inner one of which is split and of a flexible material, the other of said members having a fixed projection on the inner wall thereof, said projection having walls substantially parallel to the longitudinal axis of said members and converging toward said axis to enter the split in said inner member when said members are telescoped to spread the split portions of said inner member into intimate engagement with the other of said members.

4. In a detachable connection, relatively telescoping members, the inner one of which is split and of a bendable material, the other of said members having a fixed projection on the inner wall thereof, said projection having walls substantially parallel to the longitudinal axis of said members and converging towards said axis to enter the split in said inner member when said members are telescoped to spread the split portions of said inner member into intimate engagement with the other of said members, and said inner and outer members being of relatively soft and hard materials, respectively, whereby the inner edges of said split portions are adapted to cut into the sides of said projection to automatically compensate for dimensional variations of said members.

5. A handle connection including a handle having a non-circular socket with at least one flat side for receiving a shaft end correspondingly configurated, said shaft end being substantially longitudinally slotted in a plane intersecting said flat side to provide spaced tang portions, and a substantially wedge-shaped projection fixed to the inner wall of said socket substantially opposite said flat side so as to enter the space between said tang portions to spread the same into intimate engagement with the walls of said socket, and to maintain the flat sides of said handle socket and shift in intimate engagement.

6. A handle connection including a handle having a non-circular socket with at least one flat side for receiving a shaft end correspondingly configurated, said shaft end being substantially longitudinally slotted in a plane intersecting said flat side to provide spaced tang portions, and a substantially wedge-shaped projection fixed to the inner wall of said socket substantially opposite said flat side so as to enter the space between said tang portions to spread the same into intimate engagement with the walls of said socket, and to maintain the flat sides of said handle socket and shaft in intimate engagement, said handle socket walls and shaft being of relatively soft and hard materials, respectively, whereby the edges of said tangs are adapted to cut into the sides of said projection to automatically compensate for dimensional variations of said members.

7. A handle member having a non-circular mounting socket with at least one flat side, and a projection on said socket wall opposite said flat side.

8. A handle member having a non-circular mounting socket with at least one flat side, and a projection on said socket wall opposite said flat side, with the walls of said projection converging in a direction towards the center of said socket.

9. A handle member having an elongated non-circular section mounting socket, a longitudinal inwardly extending projection on said socket wall, and said projection having a substantially uniform triangular cross-section.

10. A handle member having a non-circular mounting socket with at least one flat side, and a projection on said socket wall opposite said flat side, with the walls of said projection converging in a direction towards the center of said socket to a relatively sharp edge.

JAMES F. BEAL.